(12) United States Patent
Simons et al.

(10) Patent No.: US 8,756,091 B2
(45) Date of Patent: *Jun. 17, 2014

(54) METHODS AND TOOLS TO SUPPORT STRATEGIC DECISION MAKING BY SPECIFYING, RELATING AND ANALYZING REQUIREMENTS, SOLUTIONS AND DEPLOYMENTS

(75) Inventors: Suzanne Barber Simons, Austin, TX (US); Thomas Jeffrey Graser, Austin, TX (US)

(73) Assignee: Aware Software, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/398,531

(22) Filed: Feb. 16, 2012

(65) Prior Publication Data

US 2012/0265775 A1 Oct. 18, 2012

Related U.S. Application Data

(63) Continuation of application No. 11/891,155, filed on Aug. 9, 2007, now Pat. No. 8,160,913.

(60) Provisional application No. 60/838,071, filed on Aug. 16, 2006.

(51) Int. Cl.
*G06Q 10/00* (2012.01)

(52) U.S. Cl.
USPC .............................. 705/7.23; 705/7.25

(58) Field of Classification Search
USPC ................................ 705/7.23, 7.25
See application file for complete search history.

(56) References Cited

U.S. PATENT DOCUMENTS

| | | | | |
|---|---|---|---|---|
| 5,189,606 A | * | 2/1993 | Burns et al. | 705/7.23 |
| 5,923,552 A | * | 7/1999 | Brown et al. | 700/100 |
| 6,601,233 B1 | * | 7/2003 | Underwood | 717/102 |
| 6,950,802 B1 | * | 9/2005 | Barnes et al. | 705/7.22 |
| 7,251,613 B2 | * | 7/2007 | Flores et al. | 705/7.36 |
| 7,870,535 B2 | * | 1/2011 | Rippert et al. | 717/100 |
| 7,899,756 B2 | * | 3/2011 | Rizzolo et al. | 705/300 |
| 2003/0110067 A1 | * | 6/2003 | Miller et al. | 705/8 |
| 2005/0021348 A1 | * | 1/2005 | Chan et al. | 705/1 |
| 2005/0080640 A1 | * | 4/2005 | Bhaskaran et al. | 705/1 |
| 2005/0251432 A1 | * | 11/2005 | Barker et al. | 705/7 |
| 2006/0117012 A1 | * | 6/2006 | Rizzolo et al. | 707/9 |
| 2006/0235732 A1 | * | 10/2006 | Miller et al. | 705/7 |

OTHER PUBLICATIONS

Graser, T.J., McGiverin, B., Barber, K.S.; "A Supply Chain Configuration Tool"; Proceedings of DETC 1997, 1997 ASME Design Engineering Technical Conference, Sacramento, California, Sep. 14-17, 1997.*

(Continued)

*Primary Examiner* — Jonathan G Sterrett
(74) *Attorney, Agent, or Firm* — Meyertons, Hood, Kivlin, Kowert & Goetzel, P.C.; Eric B. Meyertons

(57) ABSTRACT

The present invention discloses methods and tools for managing requirements, solutions, and deployments of a project. The invention provides for the creation of a portfolio of data pertaining to requirements, solutions, and deployments for the project. The relationships and dependencies between the data are mapped, and the portfolio of data and the mapping of the data are displayed in a graphical format. The portfolio of data can be queried to determine the relationships and dependencies between the data.

20 Claims, 16 Drawing Sheets

(56) References Cited

OTHER PUBLICATIONS

Barber, K.S., Graser, T.; "Effective Representation and Search in Intelligent Requirements Management and Query Tools Supporting System Stakeholders"; 3rd International Workshop on Intelligent Software Engineering, 22nd International Conference on Software Engineering; Limerick, Ireland, Jun. 6, 2000.*

PCT ISR/WO, IB, Jul. 30, 2008, Aware Software, Inc. (PCT/US07/76040).*

PCT ISR/WO, IB, Sep. 5, 2008, Aware Software, Inc. (PCT/US07/76042).*

* cited by examiner

FIG. 5

501 — VIEW #1: Function/Data/Scenario – Bus. Blueprint Components – Solutions – Deployment Milestones

| Scenarios | Functions | Solutions | Deployment Milestones |
|---|---|---|---|
| Data, Reports, and Events | Components | | |

502 — VIEW #2: Function/Data/Scenario – Bus. Blueprint Components – Non-functional Req. – Deployment Milestones

| Scenarios | Functions | Non-Functional Requirements | Deployment Milestones |
|---|---|---|---|
| Data, Reports, and Events | Components | | |

503 — VIEW #3: Function/Data/Scenario – Envisioned/Under Devel. Solns – Tested/Installed Solns – Deployment Milestones

| Functions | Envisioned Solutions | Tested Solutions | Deployment Milestones |
|---|---|---|---|
| Data, Reports, and Events | Solutions Under Dev. | Installed Solutions | |

504 — VIEW #4: Not Tested/Not Accepted Functions – Accepted/Deployed Functions – Solutions – Deployment Milestones

| Not Tested Functions | Accepted Functions | Solutions | Deployment Milestones |
|---|---|---|---|
| Not Accepted Functions | Deployed Functions | | |

505 — VIEW #5: Deployment Milestone Side-by-Side Requirement Comparison

| Deployment 1 Scenarios and Function: Scenarios | Deployment 2 Scenarios and Function: Scenarios | Deployment Comparison Deployment 1: Scenarios | Deployment Comparison Deployment 2: Scenarios |
|---|---|---|---|
| Deployment 1 Scenarios and Function: Functions | Deployment 2 Scenarios and Function: Functions | Deployment Comparison Deployment 1: Functions | Deployment Comparison Deployment 2: Functions |

FIG. 13

| User ID | Role | Viewable Content | Editable Content |
|---|---|---|---|
| jdoe | Project Manager | All | None |
| kdoe | EM | All | All Requirements, Solutions for the EM's subproject |
| ldoe | Architect | All | All |
| mdoe | Manager | All | None |
| ndoe | User | All | None |
| odoe | QA | All | Test Cases, test results |
| pdoe | CM | All | None |
| qdoe | Supplier | Only their solutions; All requirements | Only requirements the supplier contributed |

METHODS AND TOOLS TO SUPPORT STRATEGIC DECISION MAKING BY SPECIFYING, RELATING AND ANALYZING REQUIREMENTS, SOLUTIONS AND DEPLOYMENTS

CROSS-REFERENCE TO RELATED APPLICATIONS

This application is a continuation application of U.S. patent application Ser. No. 11/891,155 entitled "METHODS AND TOOLS TO SUPPORT STRATEGIC DECISION MAKING BY SPECIFYING, RELATING AND ANALYZING REQUIREMENTS, SOLUTIONS AND DEPLOYMENTS" filed on Aug. 9, 2007, and this application claims the benefit of such application and of provisional application Ser. No. 60/838,071, filed Aug. 16, 2006, entitled "Method and tools to support strategic decision making by specifying, relating and analyzing requirements, system designs, and system deployments", the contents of both of which such applications are hereby incorporated by reference.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

None.

BACKGROUND OF THE INVENTION

1. Field of the Invention

Embodiments of the invention relate generally to the strategic and tactical decision-making required for the delivery of complex systems. More particularly, embodiments of the invention relate to methods and software tools supporting strategic and tactical decision-making aimed at requirements, solutions and deployments.

2. Background Art

Managing and delivering a complex system require the proper understanding of which requirements, solutions, and deployments are applicable as well as the relationships and dependencies between those requirements, solutions and deployments. The scale and complexity of these requirements, solutions and deployments and their relationships and dependencies often overwhelm the human decision-maker. Additionally, a project generally requires many stakeholders or decision-makers (e.g., users, customers, project managers, system administrators, solution designers, solution providers/builders, vendors, testers, architects, etc.), with each contributing valuable input to the requirements, design, development, testing, deployment, and maintenance of the complex system. For example, these stakeholders must: (a) determine the scope and detail of requirements to capture, document and measure the system by; (b) forecast and assess individual customers or market needs at given times, available technology solutions, and the overall requirements for the system including functional requirements, data requirements, timing requirements, non-functional requirements, and installation requirements; (c) identify and plan for the scope of requirements to be delivered and satisfied within respective system releases and system deployments; (d) evaluate and compare technology solutions options; (e) determine which technology solutions to buy, reuse, or develop; (f) configure, evaluate and select technology solutions that best satisfy functional requirements, compatibility/integration with each other, non-functional requirements, marketplace needs or the limits of the customer's actual resources. In addition, these stakeholders typically are geographically distributed and varied in expertise. Miscommunication and misunderstandings between stakeholders can have adverse effects on the success of the project.

In short, current systems and methods are inadequate for managing, relating, and communicating the requirements, solutions, and deployments associated with large, complex projects in a manner that satisfies the decision-making needs of stakeholders with different perspectives and expertise.

BRIEF SUMMARY OF THE INVENTION

In accordance with the present invention, the disadvantages and problems associated with managing and delivering a complex system have been substantially reduced or eliminated.

The present invention provides a method for managing requirements, solutions, and deployments of a project. The method includes creating a portfolio of data, which includes a set of requirements data, a set of solutions data, and a set of deployments data for the project. The relationships and dependencies between the data are defined in order to create a mapping between the data. The portfolio of data and the mapping of the data are displayed graphically. The portfolio of data can be queried to determine the relationships and dependencies between the data. One or more users can display, query, and change the portfolio of data.

In accordance with another embodiment of the present invention, a system is provided for managing requirements, solutions, and deployments of a project. The system includes a central repository of datasets, which includes a set of requirements data, a set of solutions data, and a set of deployments data for the project. In addition, the central repository includes a set of correlation maps linking requirements data to solutions data, a set of correlation maps linking solutions data to deployments data, and a set of correlation maps linking deployments data to requirements data. The system can display the data and the mappings in the central repository. In addition, queries can be made to the central repository to determine the relationships and dependencies of the data and the results of such a query can be displayed.

In accordance with another embodiment of the present invention, a data structure is provided for defining a project. The data structure includes a set of requirements data, a set of solutions data, and a set of deployments data for the project. The data can be mapped to each other based on their relationships and dependencies.

An object of the present invention is to provide strategic and tactical decision-making support for requirements analysis, system design, system acquisition, system building, system architectures/designs, system evaluation and testing, and system deployments. More specifically, embodiments of the invention can provide decision support for decision-makers as they are often confronted with a large number of decisions, dependences, and constraints when planning, designing, building, buying or deploying complex systems.

Another object of the present invention is to allow stakeholders to separate (i.e. delineate) their concerns along three primary dimensions—requirements, solutions, and deployments. Yet stakeholders can still relate each decision along these "dimensions" and get an indication about the impact of a decision in one dimension on that dimension and on the other dimensions. In particular, embodiments of the present invention can present, relate and analyze the entire range of requirements, solutions or deployments as a means for stakeholders to view the entire portfolio of requirements, solutions and deployments.

Another object of the present invention is to provide software tools including computational reports and analysis logic allowing the computer, not the overwhelmed decision-maker, to overcome information management issues associated with large and complex sets of information, and to conduct the work of managing, relating, and evaluating large amounts of requirements, solutions and deployments and the complex associations between these requirements, solutions and deployments. In particular, embodiments of the invention are capable of presenting, relating and analyzing the right information at the right level of detail to support a stakeholder's strategic and tactical problem solving skills and to promote productivity.

Yet another object of the invention is to inform a multitude of geographically distributed stakeholders possessing varying technological expertise of the collection of requirements, solutions and deployments—termed a "portfolio." In terms of the portfolio of requirements, solutions and deployments, embodiments of the invention can provide a consistent view to a range of distributed stakeholders about current requirements posed for the system, possible solutions (e.g. solutions that are envisioned, under-development, tested, or ready to deploy), and releases and installations for respective customer markets or physical sites.

Embodiments of the invention allow for approvals and agreements—such as granting approvals to requirements accuracy, solution providers' agreeing to accept requirements, or managers' sign-off on release dates. Embodiments of the invention allow tracing changes made to the portfolio by users. All requirements, solutions, and deployment release schedules have multiple types of traceability to the source documentation, the author, the date and time of creation and any executed modifications. Embodiments of the invention can customize whom to notify for specific events. Designated users of the portfolio are notified for "events of interest."

Other objects and technical advantages are readily apparent to one skilled in the art from the following figures, descriptions, and claims.

BRIEF DESCRIPTION OF THE SEVERAL VIEWS OF THE DRAWINGS

FIG. 5 shows five tables representing different views of how data is presented to users.

FIG. 13 shows an example configuration of how Portfolio Manager is customized to limit what each user can view or edit.

Like elements in the various figures are denoted by like reference numerals for consistency.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriated arts may modify the invention here described while still achieving the favorable results of this invention. Accordingly, the following description is to be understood as being broad, teaching disclosure directed to persons of skill in the appropriate arts, and not as limiting upon the present invention.

Figure 1:
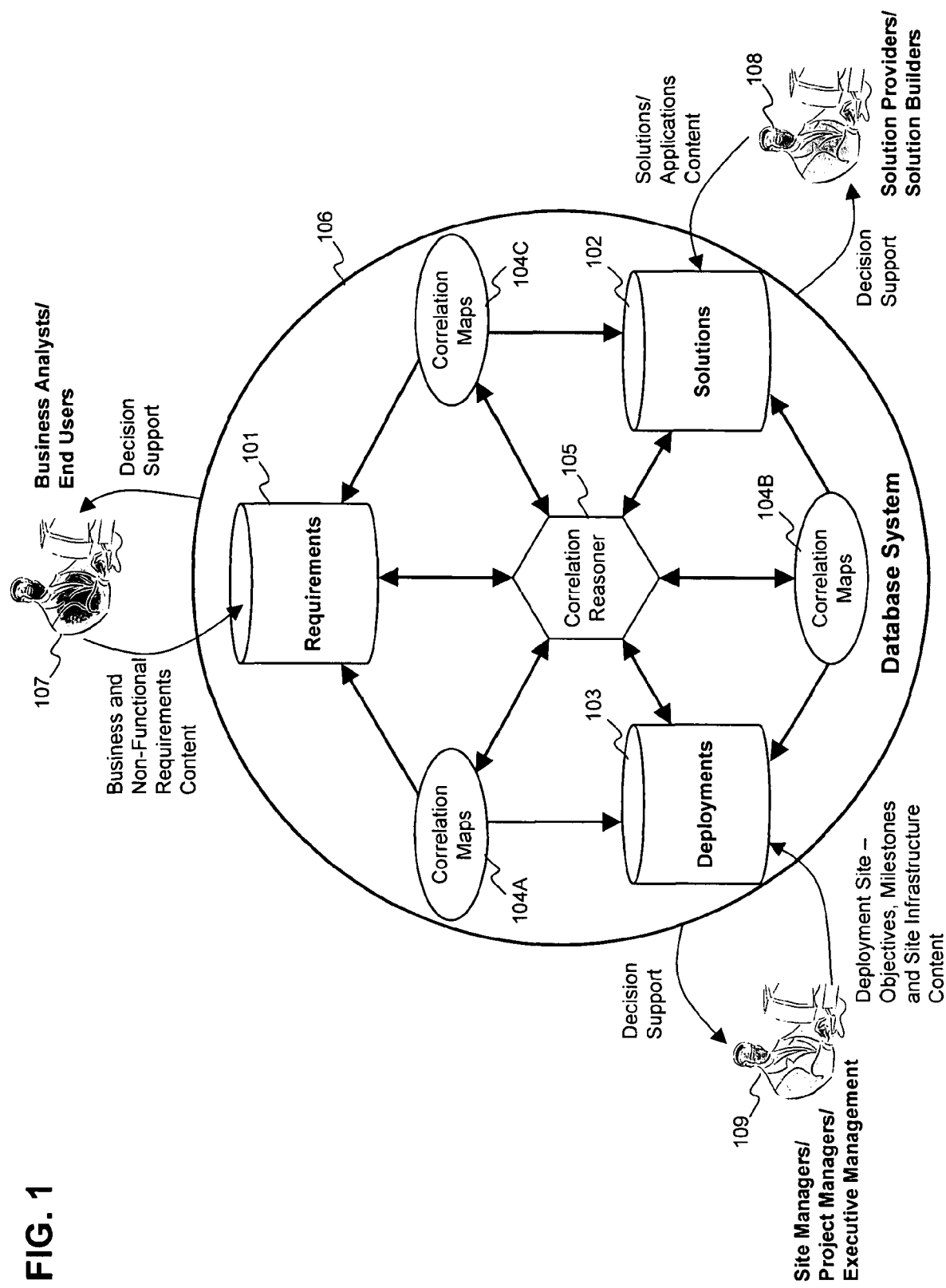
FIG. 1 illustrates how various stakeholders can utilize an embodiment of the present invention to manage the design and deployment of a complex system.

FIG. 1 illustrates how various stakeholders can utilize an embodiment of the present invention to manage the design and deployment of a complex system. The complex system is represented by a portfolio of data divided along three dimensions or datasets: requirements 101, solutions 102, and deployments 103. The requirements 101 dataset may include business requirements describing needed functionality, data, events, and results as well as "scenarios" describing operational threads of execution. Requirements may also include non-functional requirements that serve to describe desired qualities or necessary constraints for all or parts of the system. Solutions 102 may include business and non-functional requirements satisfied (or to-be satisfied) by the solution as well as installation requirements describing hardware, software, networks, contractual agreements, and environmental conditions, etc. necessary for successful deployment of respective solutions. Deployments 103 comprise deployment sites, which may have infrastructure constraints limiting the deployment of solutions. Furthermore, deployment sites may have "milestones" or installation dates.

For example, a functional requirement could be a business's need to "Access the Internet" from at a particular office building, the deployment site. The business requires fast access and can only spare a budget of $100 a month to fulfill this need, both non-functional requirements. One possible solution could be a DSL service plan offered by AT&T for $89.99 a month. Such a solution has an installation requirement—in order to install the DSL service, an existing telephone line is required. The deployment site, the office building, must have the necessary infrastructure resource (telephone line) necessary to deploy the solution. In addition, the deployment site may have a milestone date for when the requirement must be satisfied and consequently, when the solution must be deployed—for example, AT&T has scheduled a technician to install the DSL service at the office building on March 11th.

The relationships and dependencies between various data in the datasets are delineated in correlation maps 104A-C. Furthermore, the datasets and the correlation maps are linked to a common correlation reasoner 105. These datasets, correlation maps, and correlation reasoner are all part of a database system 106 that is collectively created, maintained, and utilized by various stakeholders. Typically, each stakeholder maintains the contents of one dataset by utilizing the entire database system for decision support. For example, business analysts/end users 107 may make requests for business or non-functional requirements based on described solutions 102 and deployments 103 having deployment sites and milestone release dates; solution providers/solution builders 108 may design solutions/applications based on requested requirements 101 and planned deployments 103; and site managers/project managers/executive management 109 may describe and identify opportunities and plans for deployments sites based on analysis of deployments 103, requirements 101 and solutions 102. Furthermore, solutions specifications may describe solutions that are envisioned, planned, under-development, under-test or deployment, or available for purchase.

Figure 2:
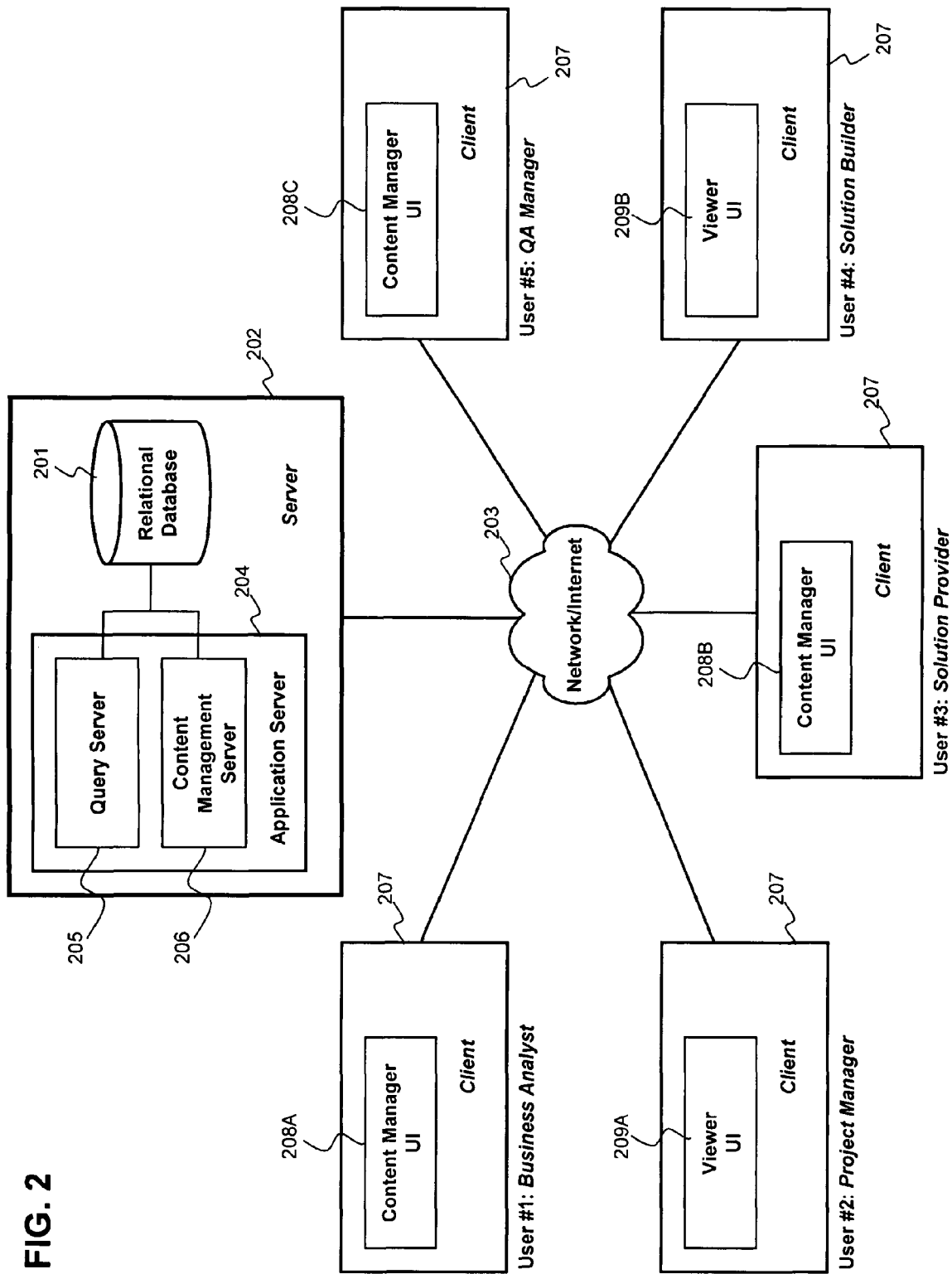
FIG. 2 shows a schema of an embodiment of the present invention implemented on a network.

Typically, the database system 106 is implemented using a relational database management system. FIG. 2 shows a schema diagram of an embodiment of the present invention implemented on a network. The relational database 201 is stored on a server 202 connected to a network/Internet 203. The relational database 201 is managed by a relational database management system (not shown). A software application on the server, termed "application server" 204, queries and manages the content of the relational database 201 through two modules, the query server 205 and content management server 206. Multiple users can access the relational database 201 through user interfaces ("UI") on client computers 207 connected to the network/Internet 203. The application server 204 manages access to the relational database 201 through user accounts. The application server 204 can limit what a user can view and edit on the relational database 201. Furthermore, when a user updates the database 201, the application server 204 can notify other users who are affected by the change. Different stakeholders, varying in their roles, may have different access to the database 201. For example, a business analyst can use a content manager interface 208A-C to view/query the entire database and manage the data pertaining to requirements on the database 201. A solution builder working for a third-party vendor may only view data pertaining to requirements on a viewer interface 209A-B.

Figure 3:
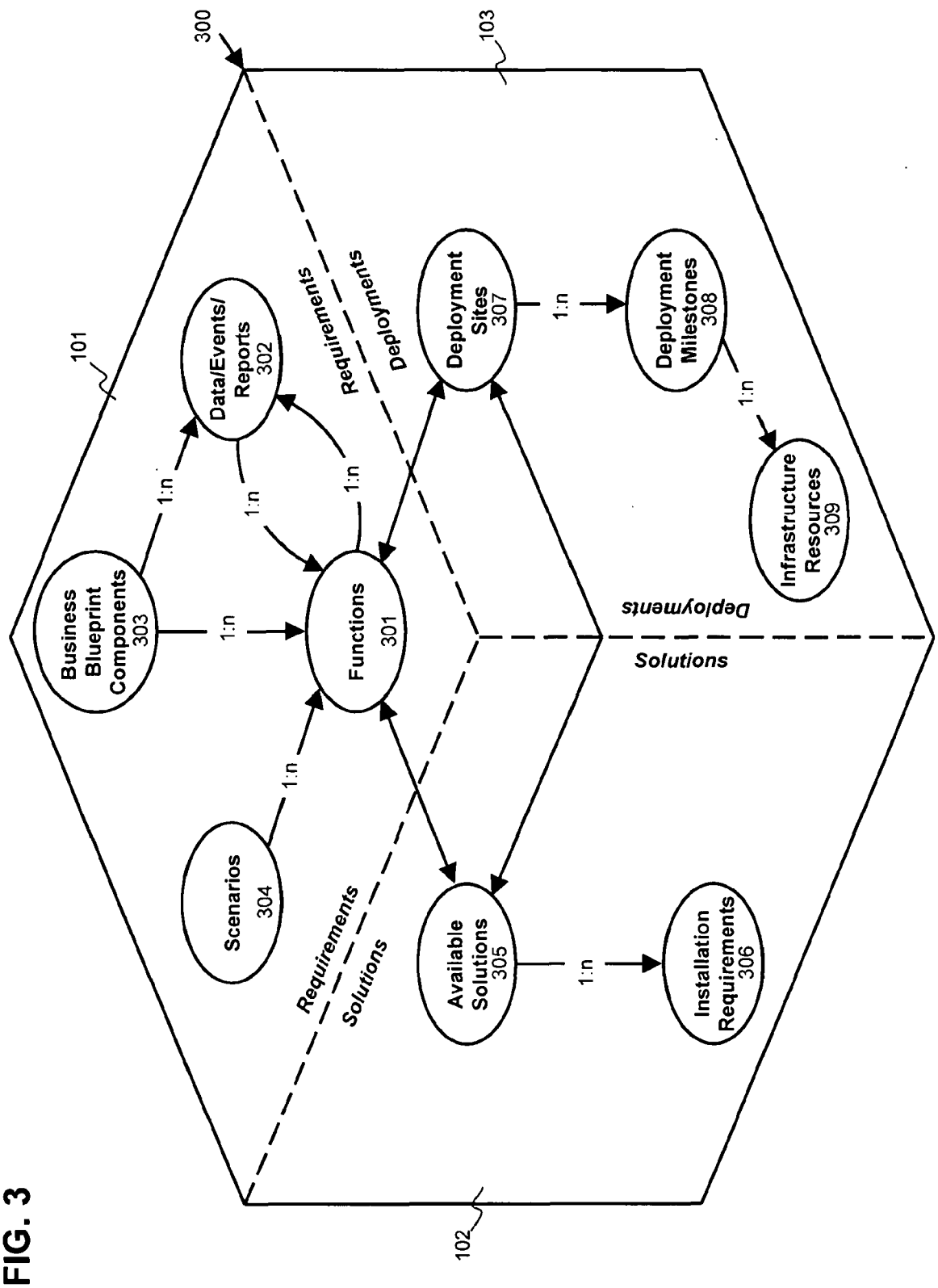
FIG. 3 shows a high-level data structure of the relational database for one embodiment of the present invention.

FIG. 3 shows a high-level data structure 300 of the relational database 201 for one embodiment of the present invention. The data structure 300 is divided along three dimensions: requirements 101, solutions 102, and deployments 103. Business requirements include scenario, function and data/event/report. Functional requirements are represented as units of "functions" 301. Each function 301 may have a number of data, events and/or report 302 required as input or output. Related functions 301 and data/events/reports 302 can be logically grouped into business blueprint components 303. In addition, functions 301 that operate in sequence can be grouped into operational scenarios 304. Each available solution 305 can have a number of installation requirements 306. Similarly, each deployment site 307 can have a number of deployment milestones 308 and the infrastructure resources available at a respective milestone are described 309. As used in FIG. 3, single-sided arrows with "1:n" represent a one-to-many relationship between two objects. Double-sided arrows denote an association between objects.

The mapping of requirements 101, solutions 102, and deployments 103 is shown in FIG. 3. Solutions 102 are associated with requirements 101 based on whether the available solutions 305 can satisfy the functions 301 of the requirements. Requirements 101 are associated with deployments 103 based on whether the functions 301 of the requirements are to be satisfied at the deployment sites 307 and deployment milestones 308. Solutions 102 are associated with deployments 103 based on whether the installation requirements 306 of the available solutions 305 are supported by the infrastructure resources 309 of the deployments sites 307 or whether the infrastructure resources 309 of the deployments sites 307 satisfy the installation requirements 308 of the selected solutions 305.

While the mapping, correlation, and key relationships in the data structure 300 have been described above, additional non-functional requirements and other relationships between scenarios, functions, data/events/reports, solutions and deployments may be defined and mapped depending on the needs of the decision makers and the objectives of the project.

One embodiment of the present invention is the Portfolio Manager 3D software system ("Portfolio Manager" or "PM") by Aware Software Inc. The current version of Portfolio Manager uses MySQL to implement the relational database 201. The software applications in Portfolio Manager are coded in Java. The application server 204 runs under the JBoss application server and the client applications are deployed using the Java Web Start model. The Portfolio Manager software system can be implemented on any platform that supports MySQL, Java, and JBoss.

Figure 4:
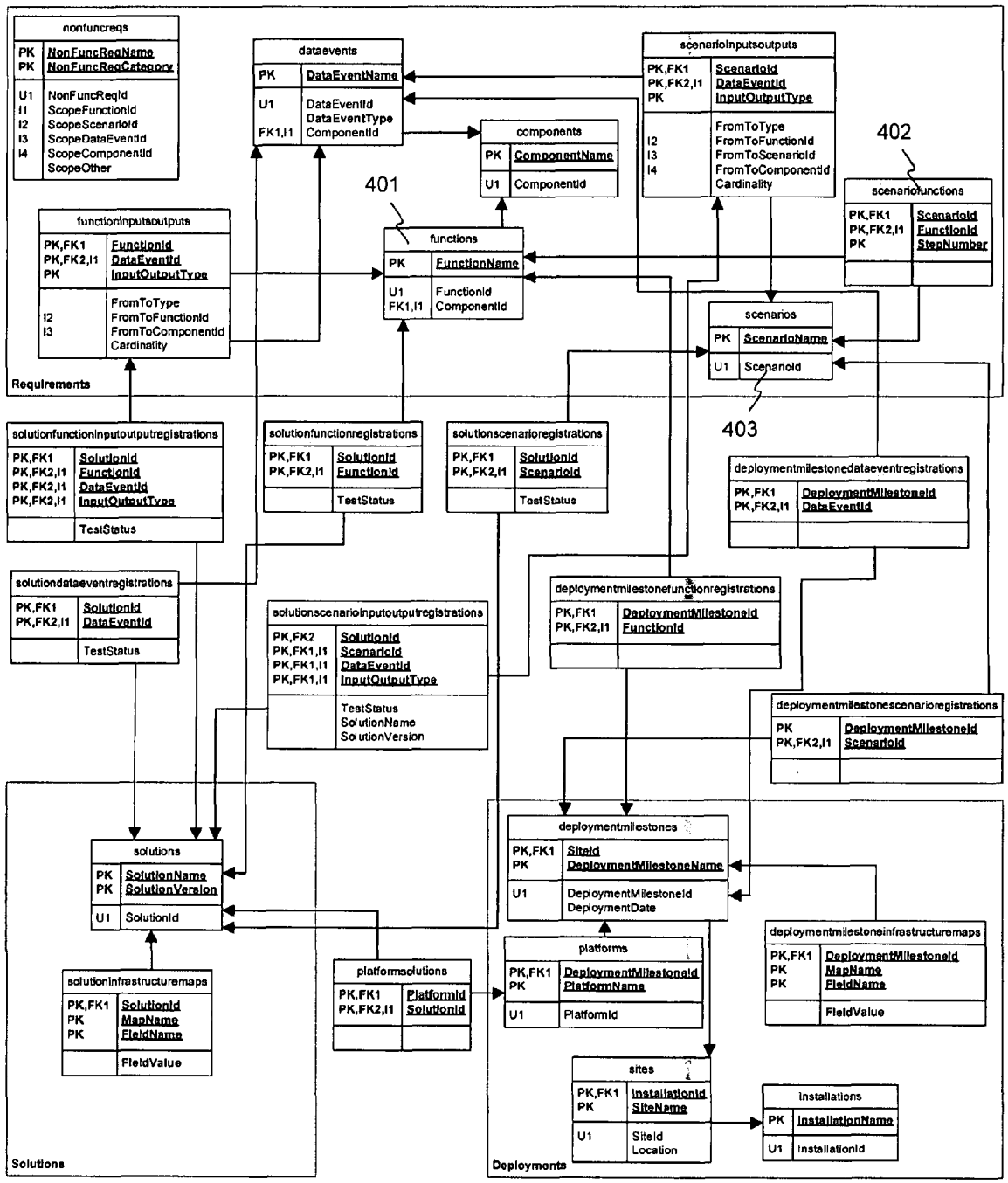
FIG. 4 shows a diagram of the database structure for a sample project in Portfolio Manager.

The database structure 300 for each project in Portfolio Manager can be customized. FIG. 4 shows a diagram of the database structure 300 for a sample project in Portfolio Manager. Each table within the database is labeled with a table name. Fields within the table are listed below the table name, with the first column denoting the field type and the second column denoting the field name. Single-sided arrows are drawn to link a table with the foreign key ("FK") to the table with the primary key ("PK"). "U" refers to a field containing a "unique index," while "I" refers to a field containing an "index" used to improve query performance that is not necessarily unique. Tables with requirements, solutions, and deployments data are placed in their respective shaded area.

Users can query and view data on the database through two graphic user interfaces ("GUI") applications, the content viewer and content manager. These two applications provide similar views, but the content manager allows users to update data on the database. FIG. 5 shows five tables representing different GUI views 501-505 of how data is presented to users. Each numbered view is followed by a named description. Each view contains four columns, with each column containing one or two rows of cells. Each cell contains a name for a subset of data, usually the name of database table containing the subset of data. Each cell represents a panel in the GUI, which lists the subset of data.

Figure 6:
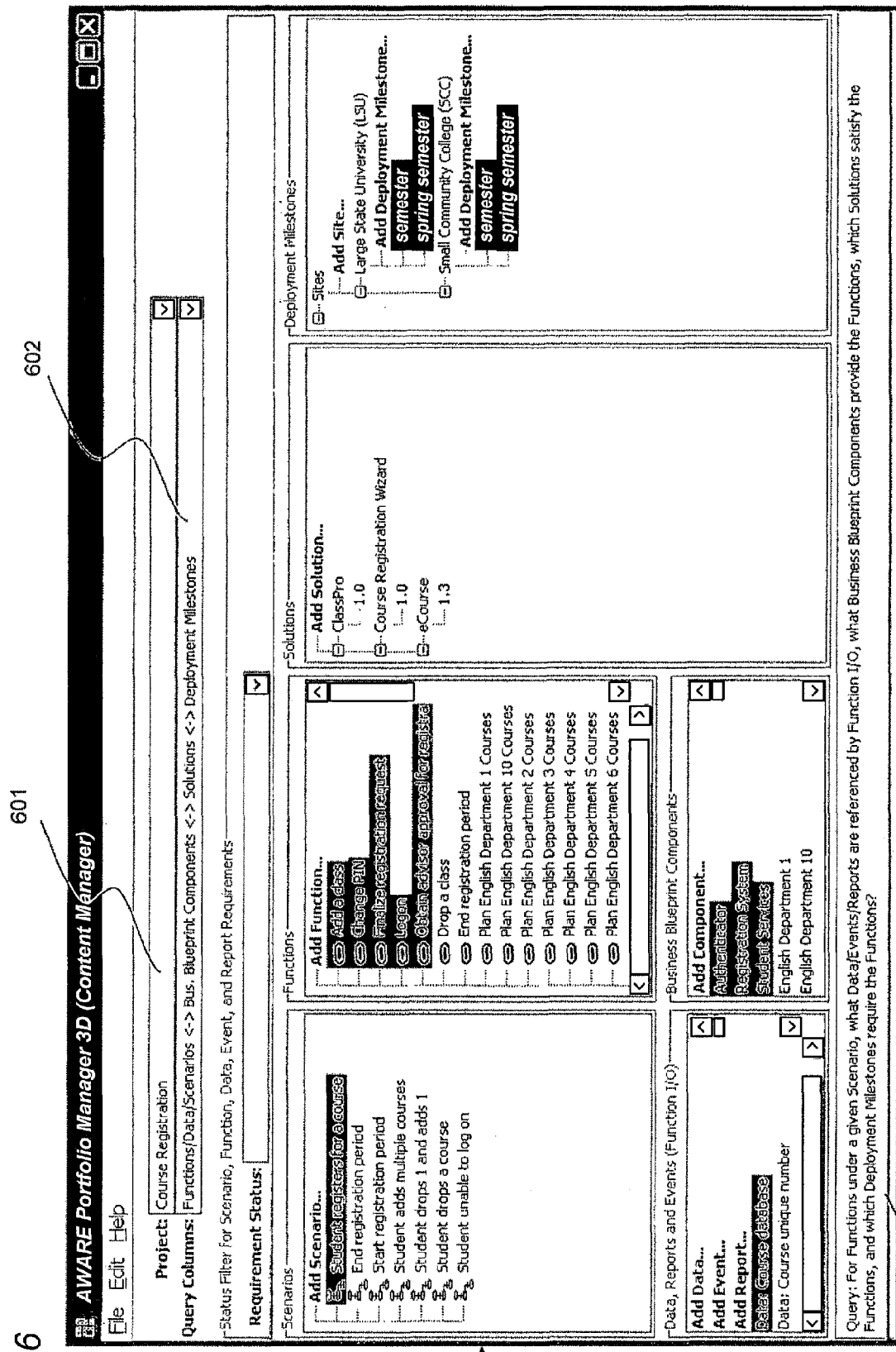
FIG. 6 shows a Graphical User Interface (GUI) displaying View #1, which provides users with an overview of the business requirements, solutions and deployments.

FIG. 6 shows an example GUI of View #1 501. Users can choose a project to view or manage using the "Project" drop-down menu 601. Users can choose a particular view under the "Query Columns" drop-down menu 602. In View #1 501, the first two columns display business requirements in four panels, namely scenarios, data, events, and reports, functions, and business blueprint components. The third and fourth columns display solutions and deployment milestones respectively. Each deployment milestone is listed under a particular deployment site. Under the content manager GUI, users can add an entry to the underlying database by using the bolded "add" function within each panel. Users can also edit or get more information on a particular entry by right clicking over the entry.

Figure 7A:
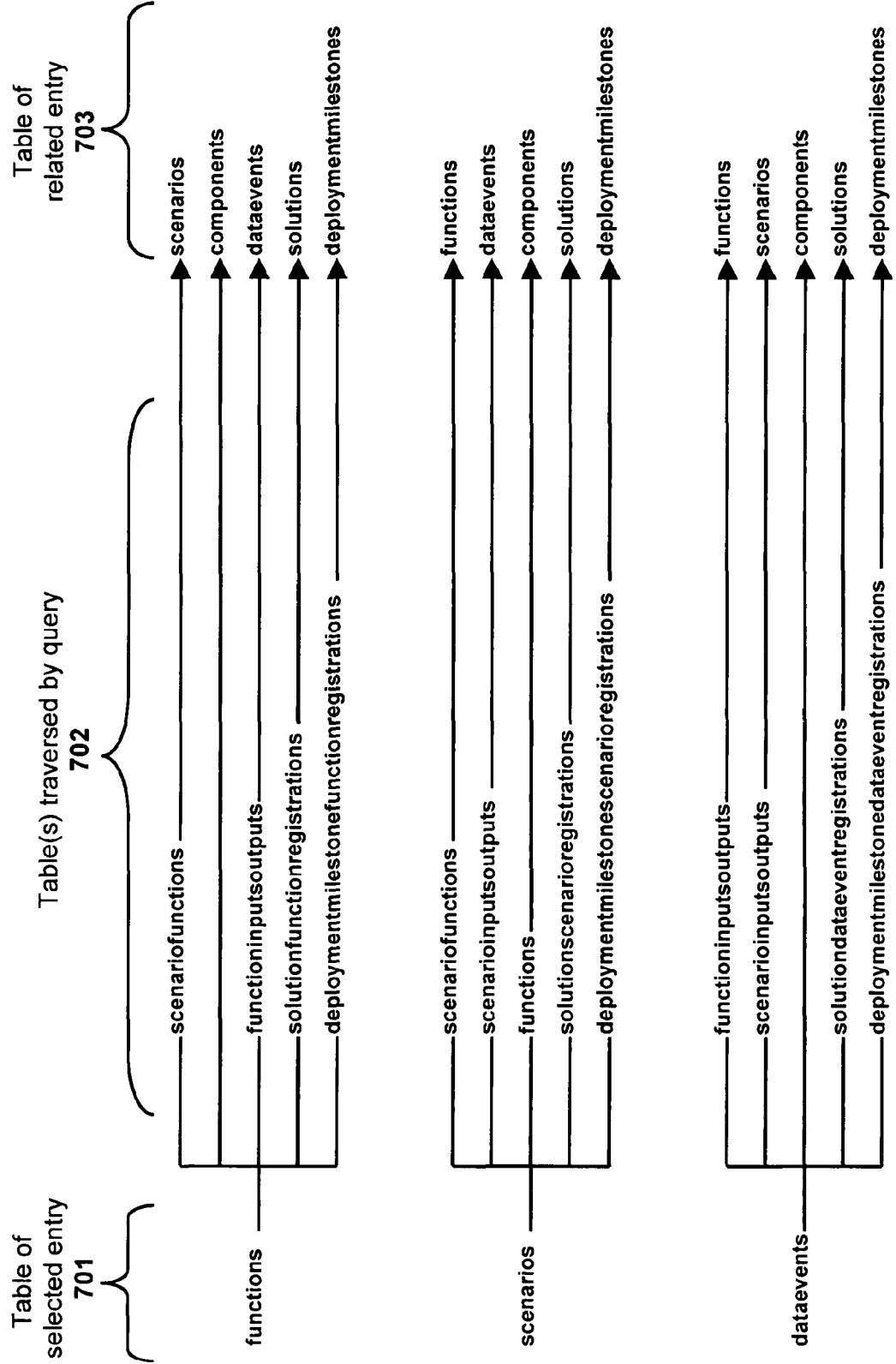
FIGS. 7A and 7B show the path each query takes through the data structure in FIG. 4 when the user clicks on an entry in one of the six panels under View #1.
Figure 7B:
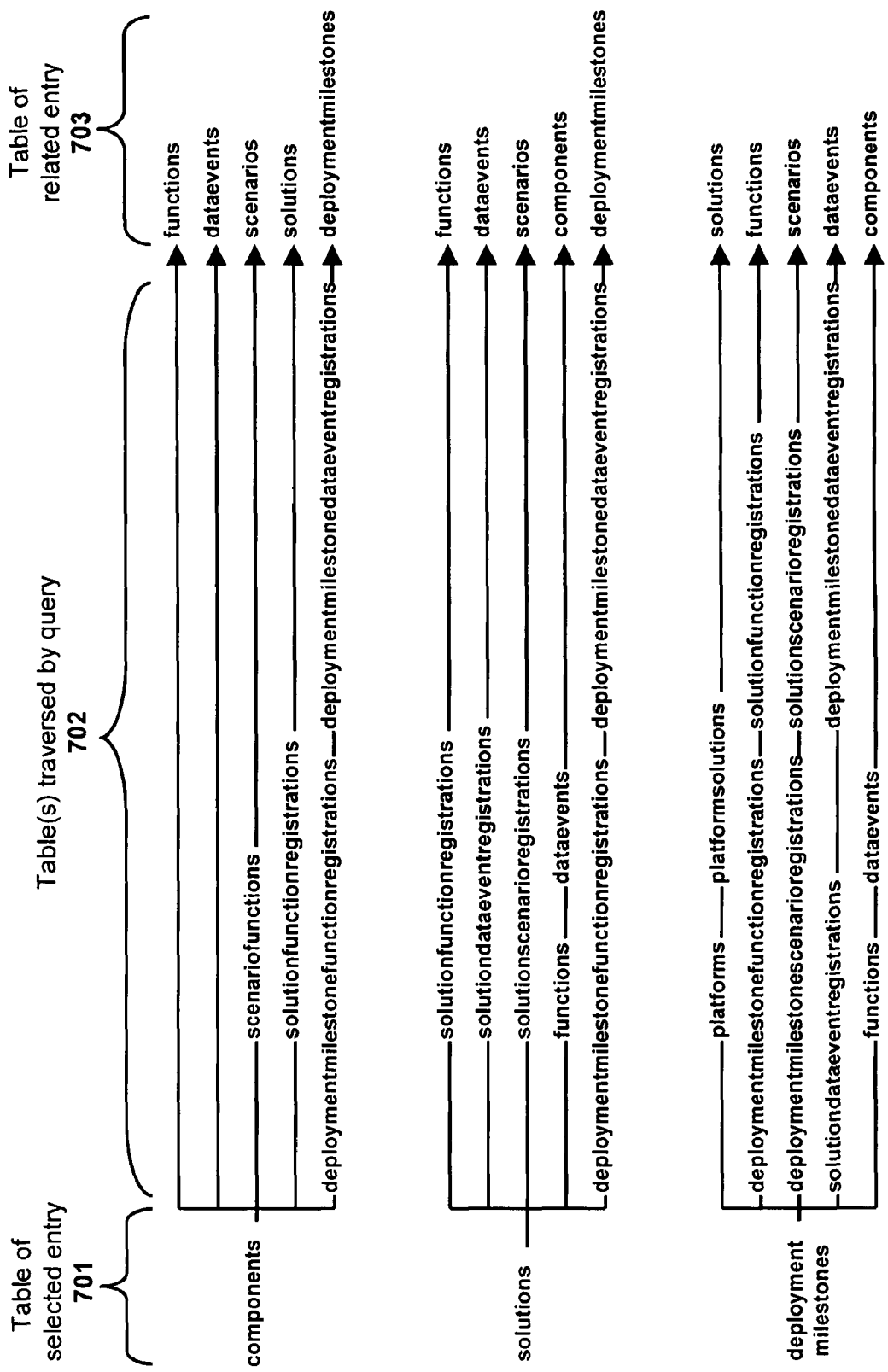

Under any GUI view, by clicking on or selecting an entry, the user executes a query to determine whether a relationship exists between the selected entry and any entry in the other panels. The query is stated in the form of a question at the bottom of the content manager 603. FIG. 7A-B show the path each query takes through the data structure in FIG. 4 when the user clicks on an entry in one of the six panels under View #1 501. Each path begins with the table of the selected entry 701 which corresponds with the entry in the panel selected by the user. The path traverses through different tables 702 before arriving at the table of related entry 703. For example using the first path in FIG. 7A, when a user clicks on an entry under the functions panel under View #1 501, a query is initiated. The query starts at the functions table 401 as shown in FIG. 4, traverses through the scenariofunctions table 402, and before arriving at the related entry in the scenarios table 403. The path follows the selected function through other tables to arrive at the related entry in tables corresponding to other panels in View #1 501.

Figure 8:
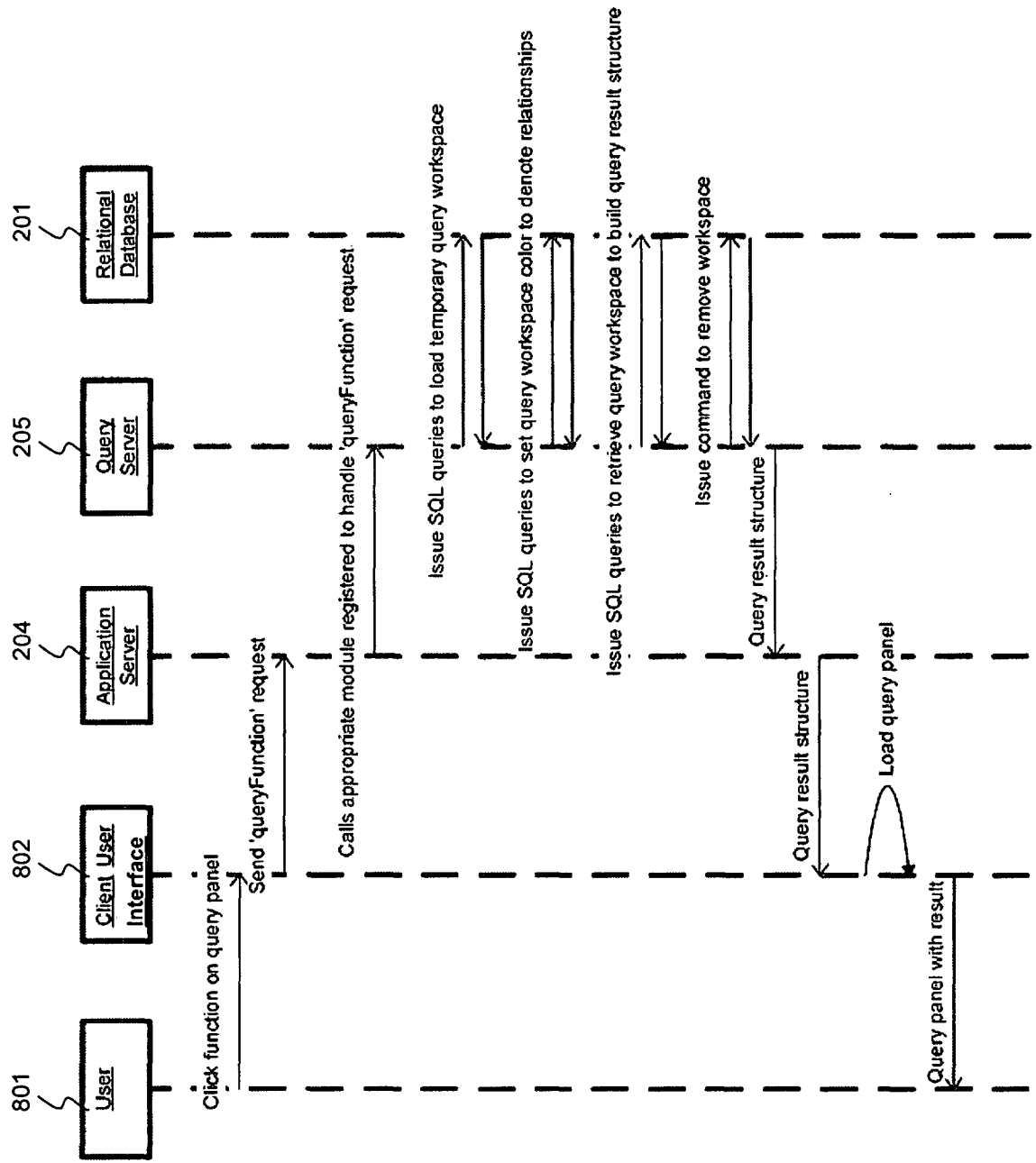
FIG. 8 shows the steps of how a user requested query is implemented through the Portfolio Manager system.

FIG. 8 shows the steps of how a user requested query is implemented through the Portfolio Manager system. In this example, the user 801 initiates a query request by clicking on a function in the query panel shown in FIG. 9. The client user interface 802 sends a "queryFunction" request to the PM application server 204. The application server 204 calls the appropriate module registered to handle the queryFunction request—in this case, the query server 205. The query server 205 then issues a series of SQL queries that are answered by the relational database 201. First, the query server 205 issues queries to load a temporary query workspace. Next, the query server 205 issues queries to set the query workspace color to denote relationships. Finally, the query server 205 issues a command to remove the workspace. The query server 205 then returns the query result structure to the application server 204, which in turn sends the result structure to the client user interface 802. The client user interface 802 loads the results to the query panel, which are visible to the user 701. The requirements, solutions, and deployments that comprise the query results are highlighted and sorted so that they precede all other entries in their respective lists (e.g., the selected function and all related data, events, reports, solutions, and deployment milestones in FIG. 9), and a textual description of the query issued is placed in the message area at the bottom of the panel 901—e.g., "For given Functions, what Data/Events/Reports are referenced by Function I/O, which Solutions satisfy the Functions, and what are the states of those solutions (Envisioned, Under Development, Tested, or Installed), and which Deployment Milestones require the Functions?"

The selected entry and the results of the query are highlighted in various colors, indicating different levels of relationship between the data. In general, the different colors indicate to what extent the related entry is in compliance with the selected entry. The selected entry along with related entries that are in full compliance are highlighted in green. For example if a function is selected, then function along with any solution that fully complies with the function is highlighted in green. Related entries that partially comply with the selected entry are highlighted in yellow. And related entries that do not comply with the selected entry are highlighted in red. Furthermore, related entries that are associated with the selected entry, but are not described in terms of compliance, are highlighted in blue.

View #1 501 provides users with an overview of the business requirements, solutions and deployments. Business requirements are displayed as scenarios, functions, and data/events/reports. By selecting a requirement, the user can determine what other requirements are related, which solutions are capable of complying with the selected requirement, and where (deployment site) and when (deployment milestone) the requirement must be satisfied. By selecting a solution, the user can determine which requirements are satisfied by the selected solution and where (deployment site) and when (deployment milestone) the solution must be deployed. By selecting a deployment site or milestone, the user can determine which requirements are needed by the selected deployment and which solutions are deployed at the deployment to satisfy those requirements. High-level business blueprint components are intended to provide logical architectural components. These business blueprint components are described by a logical grouping of functional, data, event and report requirements. By selecting a business blueprint component, the user can determine which functions, data, events, and reports have been assigned to the business blueprint component, which solutions are capable of delivering the functionality belonging to the selected business blueprint component, and which deployments need the highlighted requirements associated with the selected business blueprint component.

View #2 502 (associated GUI not shown) is similar to View #1 501, except the third column contains a panel for non-functional requirements in place of solutions. Non-functional requirements can be used to describe certain qualities users want or certain constraints users want to impose. Examples of non-functional requirements include reusability, flexibility, usability, reliability, maintainability, performance, cost and schedule constraints, security, internationalization, and customization. All non-functional requirements have a "scope," a sphere of influence, to which those qualities or constraints defined by the non-functional requirement apply where the scope may be the entire system, certain parts of the system, or specific requirements. Users can use this view to analyze non-functional requirements that are linked to business requirements (scenarios, functions, data, events, reports) or parts of the system (entire system, business blueprint components). By selecting a non-functional requirement, the user can determine which requirements or parts of the system the non-functional requirement applies to and where (deployment site) and when (deployment milestone) the non-functional requirement is to be deployed. Editing the non-functional requirement within this view will allow users to specify not only the "scope" of the non-functional requirement but also the acceptance criteria and methods of evaluating the system to determine if the system has satisfied the defined non-functional requirement.

Figure 9:
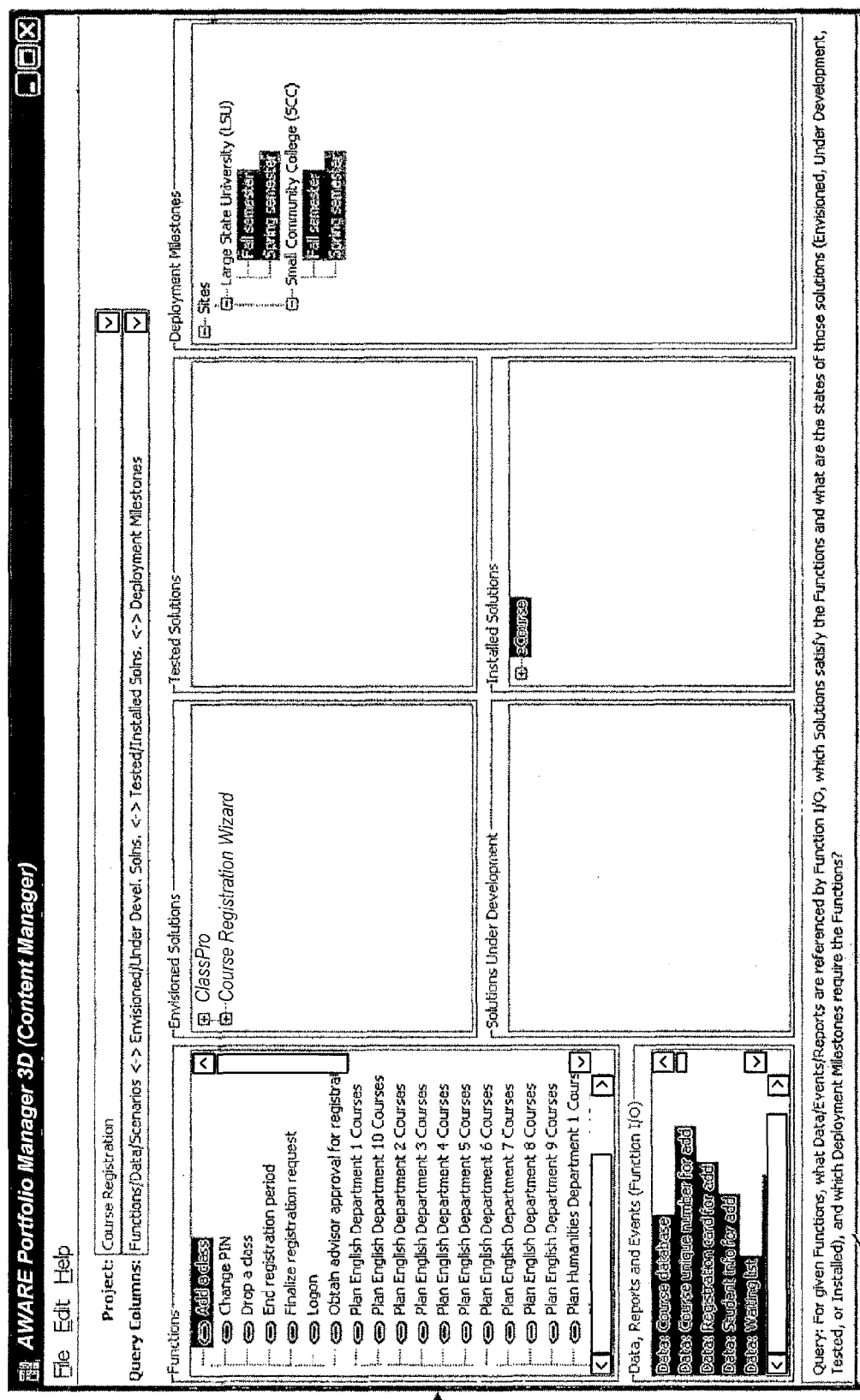
FIG. 9 shows a GUI displaying View #3, which allows users to analyze the maturity of solutions for respective to functional requirements.

Under View #3 503, as shown in an example GUI in FIG. 9, users can analyze the maturity of solutions with respect to functional requirements. The status of the solutions is divided into four panels: envisioned solutions, solutions under development, tested solutions and installed solutions. Using this view, users can define and associate one or more plans to test the solutions. By selecting a deployment milestone, the user can determine which requirements are needed at the selected deployment milestone and the status of the solutions meeting those requirements.

Figure 10:
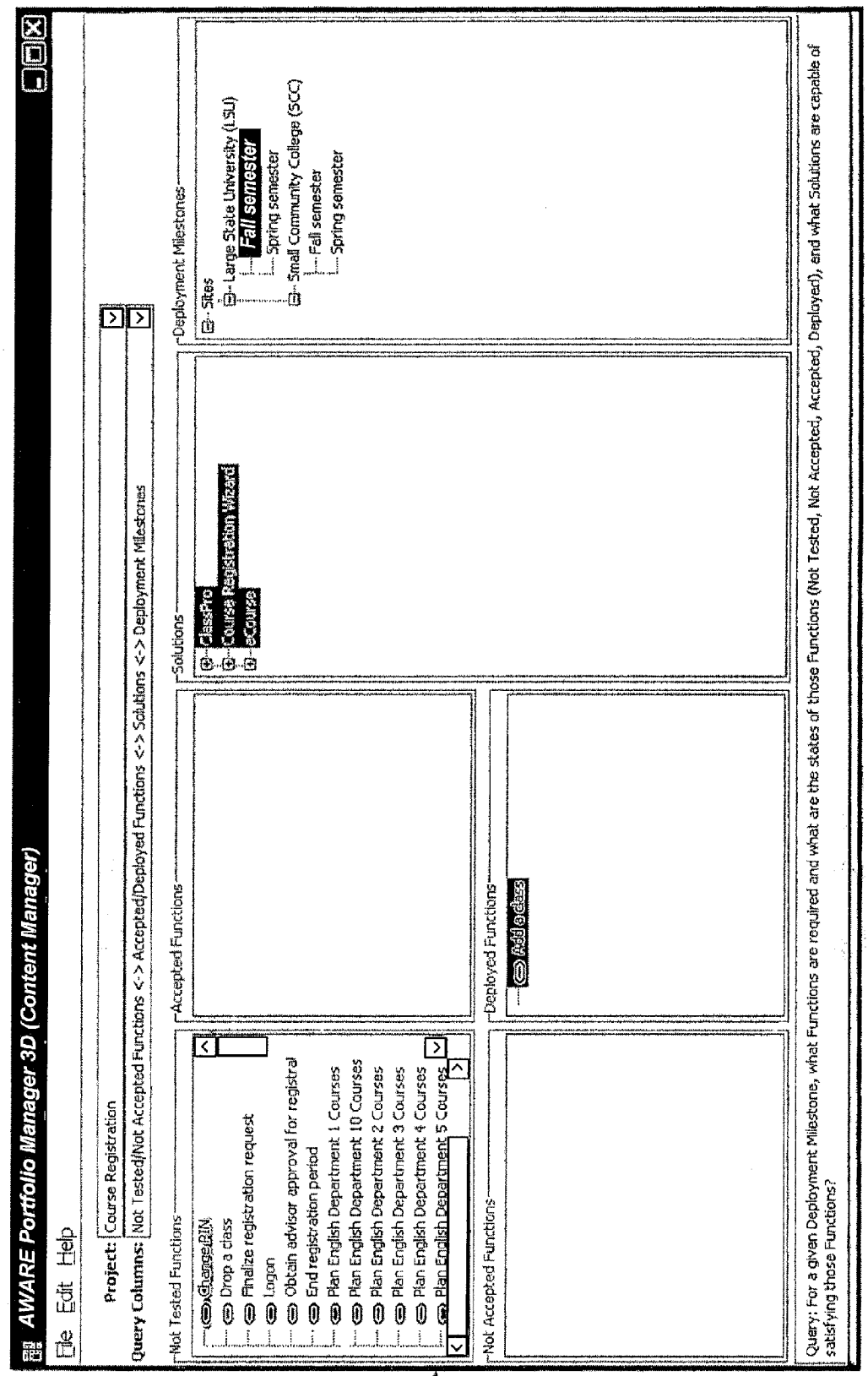
FIG. 10 shows a GUI displaying View #4, which allows users to analyze the state of solution support for functional requirements.

Under View #4 504, as shown in an example GUI in FIG. 10, users can analyze the state of solution "acceptance" with respect to functional requirements for which it was specified to satisfy. The "acceptance" status for the functions is divided into four panels: not tested functions, not accepted functions (meaning solution functions were tested and found not to be acceptable), accepted functions (meaning solution functions were tested and found to be acceptable), and deployed functions (meaning solution functions were tested, found to be acceptable, and were deployed to the operational environment). By selecting a deployment milestone, the user can determine the "acceptance" status of the functions required by the selected deployment milestone and the solutions satisfying those functions. Alternatively, this view can be implemented to show the solution "acceptance" for scenarios rather than functions.

Figure 11:
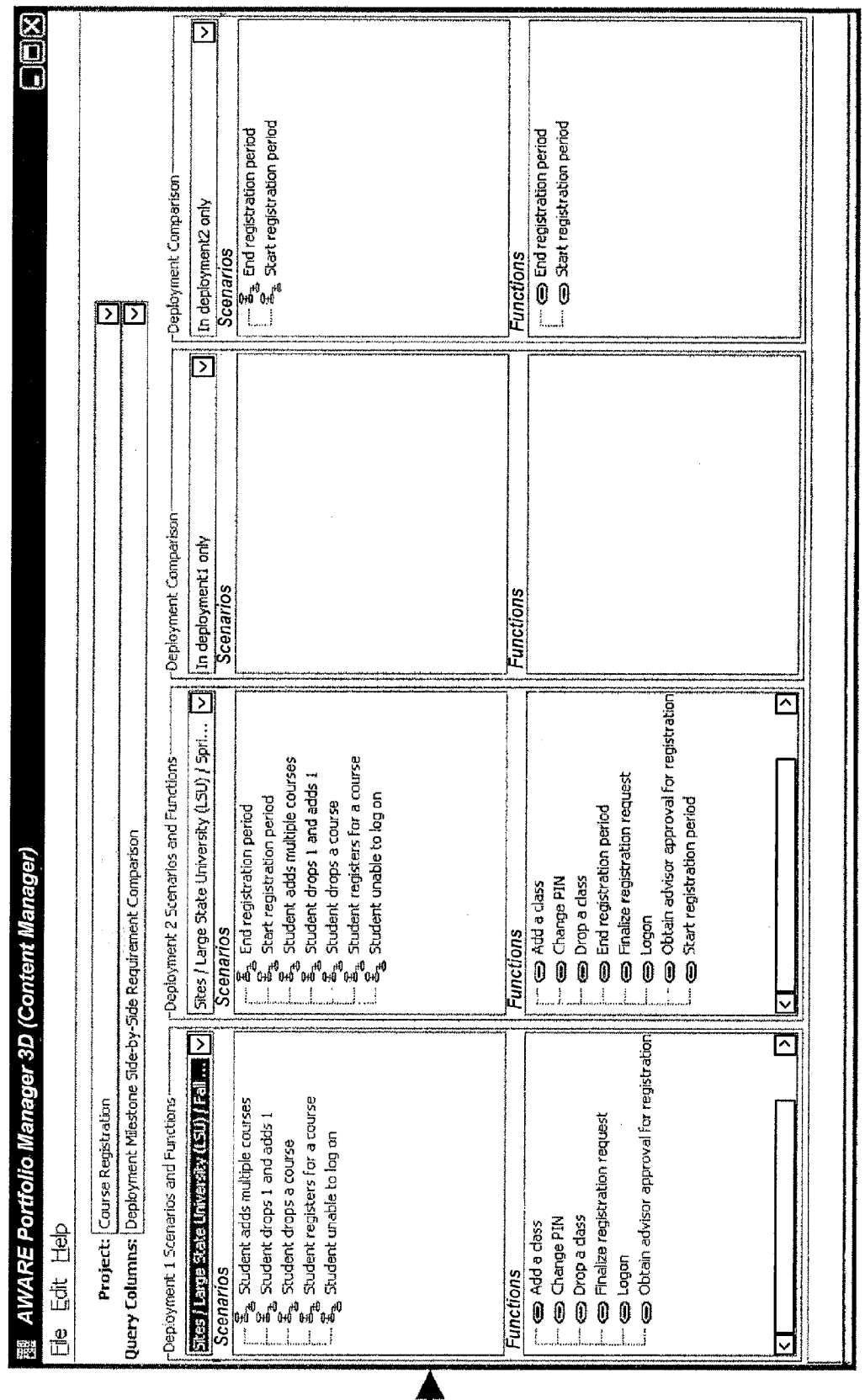
FIG. 11 shows a GUI displaying View #5, which allows users to analyze and compare the functional requirements of two deployments side-by-side.

Under View #5 505, as shown in an example GUI in FIG. 11, users can analyze and compare the scenario and functional requirements of two deployments side-by-side. Specifically, deployment milestones at respective deployment sites are compared based on the similarities and/or differences between the respective requirements to be satisfied at the selected deployment milestones.

Figure 12A:
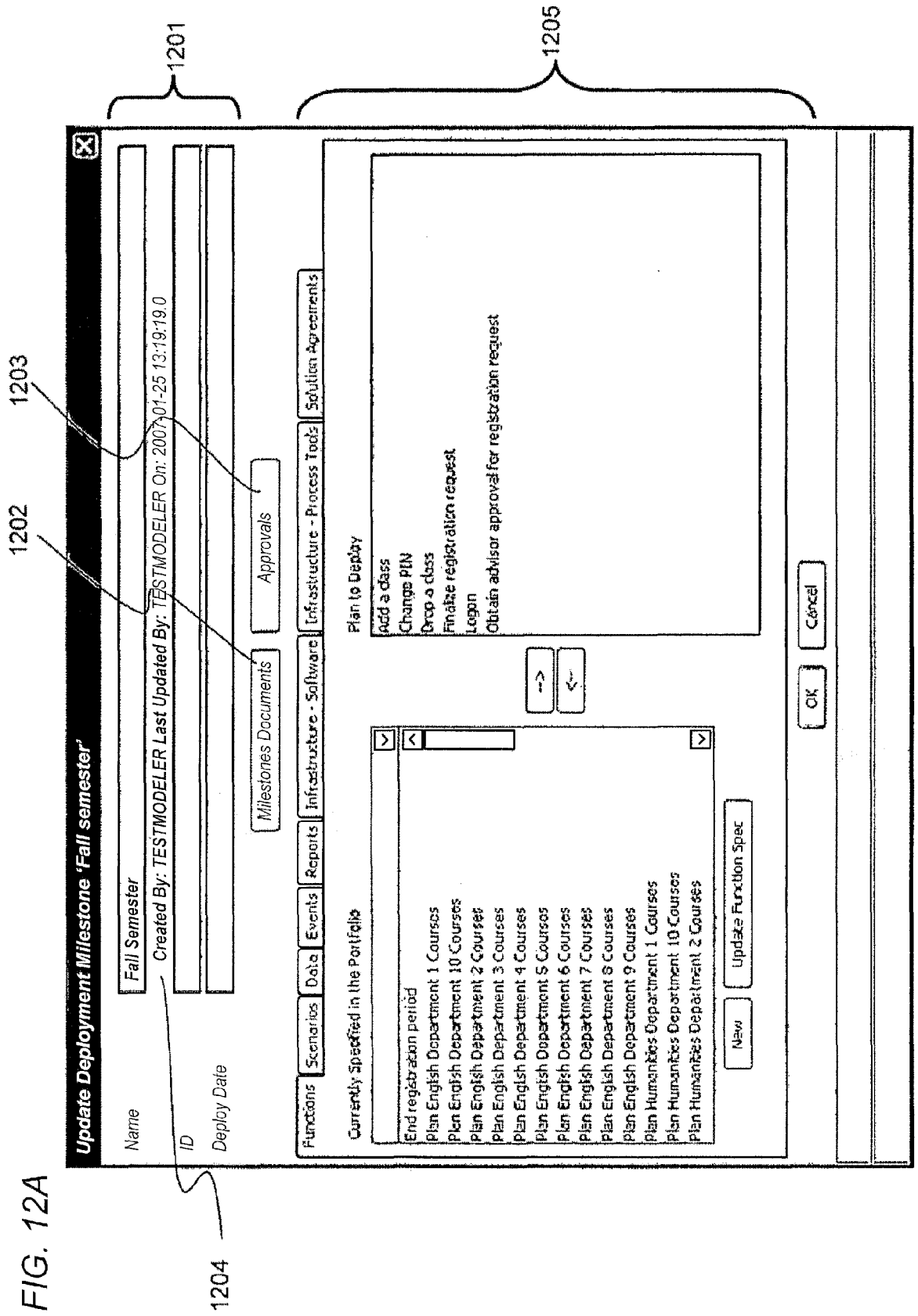
FIG. 12A shows a GUI displaying an example of how deployment milestone data is inputted into Portfolio Manager.

FIG. 12A shows a GUI displaying an example of how data is inputted into Portfolio Manager. For this example, an input window for updating a deployment milestone is shown, but input windows for other entities (scenarios, functions, solutions, data, events, reports, non-functional requirements) contain similar input facilities. The name, ID and deployment date can be updated at the top of the window 1201. The deployment milestone can be made traceable to one or more reference (source) documents using the "milestone documents" button 1202. All requirements, solutions and deployment input facilities allow users to attach a document or link the URL of external documents. In addition, an authorization or approval of the milestone can be issued using the "approvals" button 1203. Using this function, certain users can approve of changes made to the database. Furthermore, all additions and modifications to requirements, solution specifications and deployment site and milestone specifications are logged to provide users with tracking information indicating the evolution of each. User are provided tracking information (sources of the data) 1204 indicating when this particular milestone was created, last updated and by whom. The specifications for the deployment milestone can be updated at the bottom of the window 1205. The deployment milestone is described by the scenarios, functions, data, events, and reports required for the deployment milestone being specified. Additionally, the deployment environment (computing platforms and associated software, hardware and networking infrastructure) to be available at the deployment milestone is described.

Figure 12B:
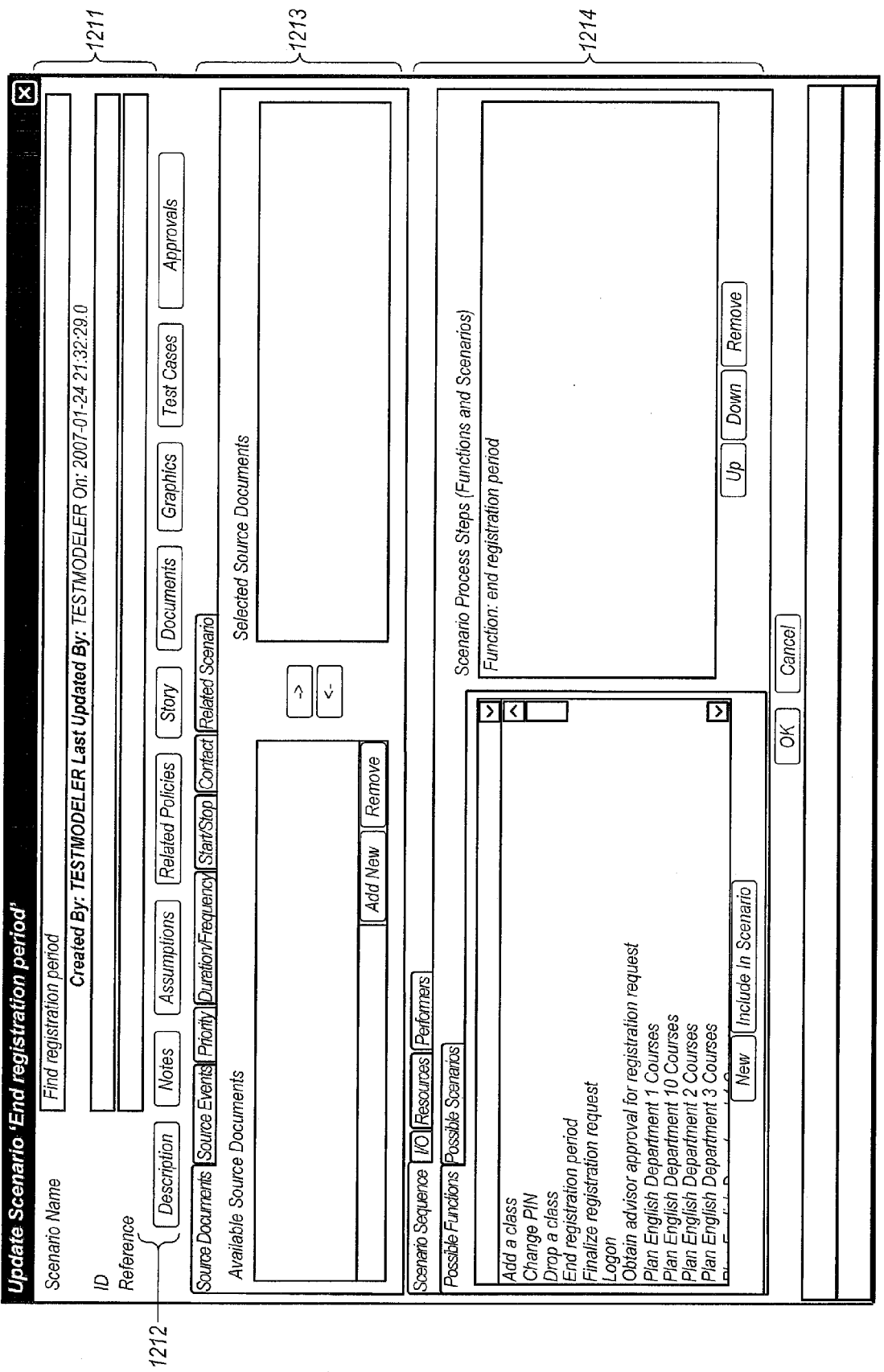
FIG. 12B shows a GUI displaying an example of how scenario data is inputted into Portfolio Manager.

FIG. 12B shows a GUI displaying an example of how scenario data is inputted into Portfolio Manager. The name and reference identifying the scenario can be updated at the top of the window 1211, and a field containing a unique ID is populated automatically when the scenario is saved. Underneath the identification information is a row of buttons 1212 used to enter a description, notes, assumptions, related policies, a storyline from which the scenario was derived, related documents, graphics, test cases and review approvals. Next, a first set of tabs 1213 allows the user to identify the documents and events that represent the sources for the scenario specification. In addition, the user can set the scenario's priority with respect to other requirements, execution duration and frequency, start/stop conditions (i.e., pre-/post-conditions), contact information, and related scenarios, such as exceptions, alternate flows, and vignettes. Finally, a second set of tabs 1214 allows the user to define (i) the sequence of functions (and/or other sub-scenarios) that comprise the scenario; (ii) the data, events, and reports that are input to and output from the scenarios; (iii) the resources required to execute the scenario; and (iv) the types of performer capable of executing the scenario.

Portfolio Manager can be configured to limit a user's ability to view, query and change the portfolio of data to less than the entire portfolio. Typically, users are limited to what they can view or edit based on their role in the project. FIG. 13 shows an example configuration of how Portfolio Manager is customized to limit what each user can view or edit. Portfolio Manager stores a table containing a user ID 1301 for each user, their role 1302 in the project, the user's viewable content 1303, and the user's editable content 1304. This table can be configured to limit each user's access to the database. For example based on the table in FIG. 13, John Doe has a user ID of "jdoe." He is a project manager who can view all the contents of the database, but cannot edit any of the content.

Figure 14:
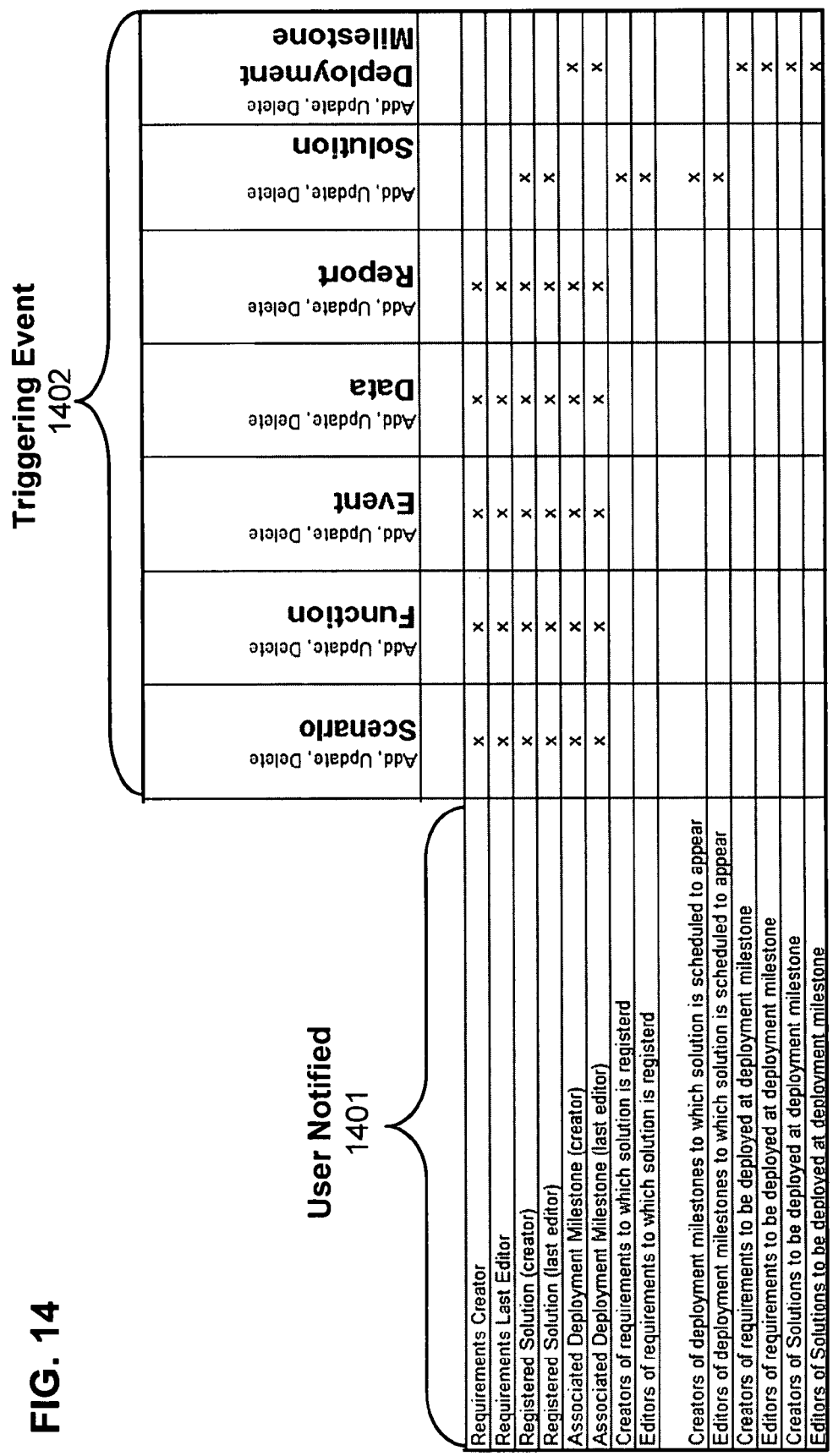
FIG. 14 shows an example configuration of how Portfolio Manager is customized to determine which user gets notified when the database is updated.

Portfolio Manager can also be configured to notify certain users in the event a requirement, solution, or deployment has been updated. FIG. 14 shows an example configuration of how Portfolio Manager is customized to determine which user gets notified for respective events corresponding to changes to the requirements, solutions or deployments in the database. Portfolio Manager stores a table containing policies on which user gets notified 1401 when a triggering event 1402 occurs. For example based on the table in FIG. 14, when any requirement (scenario, function, event, data, or report) is added, updated or deleted, the user who created the particular requirement (requirements creator) is notified of the change.

Users can also generate reports based on the data using Portfolio Manager. Users can generate charts, graphs, as well as other documents such as software requirement specifications based on the data. Charts provide summary information in a variety formats (bar charts, pie charts, etc.) to reflect different summaries: number of requirements per milestone, number of requirements satisfied by solutions, number of requirements not satisfied by solutions, number of functions not described in a scenario, etc. Reports provide users with easy-to-read documents in a variety of formats (including HTML, Adobe PDF, Microsoft Word) capturing user-specified content. In other words, users can select the report content as well as the intended audience and the necessary reviewers and approvals for the generated document.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention. Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for managing requirements, solutions, and deployments of a project, the method comprising the steps of:
    creating a portfolio of data comprising:
        a first set of data pertaining to the requirements of the project, wherein requirements comprise functions and events;
        a second set of data pertaining to the solutions of the project, wherein solutions have installation requirements; and
        a third set of data pertaining to the deployments of the project, wherein deployments comprise deployment sites, milestones, and infrastructure resources;
    mapping, by a computer system, the data in the portfolio based on the relationship and dependency between the data to obtain mapped data, wherein mapping the data in the portfolio comprises generating, by the computer system:
        a first set of correlation maps linking one or more data in the first dataset to one or more data in the second dataset based on whether the solutions satisfy the requirements of the project;
        a second set of correlation maps linking one or more data in the first dataset to one or more data in the third dataset based on whether the requirements of the project are to be satisfied by the deployment sites and milestones; and
        a third set of correlation maps linking one or more data in the second dataset to one or more data in the third dataset based on whether the infrastructure resources satisfy the installation requirements of the solutions; and
    displaying data based on whether the solutions satisfy requirements, wherein solutions that satisfy requirements are differentiated in the display by a visual indicator from solutions that do not satisfy requirements, whether requirements are satisfied at the deployment sites and milestones, wherein requirements that are satisfied by the deployment sites and milestones are differentiated in the display by a visual indicator from the requirements that are not satisfied by the deployment sites and milestones, or whether the infrastructure resources of the deployments satisfy the installation requirements of the solutions, wherein infrastructure resources of the deployments that satisfy the installation requirements of the solutions are differentiated in the display by a visual indicator from infrastructure resources of the deployments that do not satisfy the installation requirements of the solutions.

2. The method of claim 1, further querying the portfolio to determine a relationship and dependency of the data in the portfolio and displaying both resulting data and a mapping of the resulting data.

3. The method of claim 1, further comprising receiving a change of the portfolio of data.

4. The method of claim 3, further comprising limiting a user's ability to view, query and change the portfolio of data to less than an entire portfolio of data.

5. The method of claim 3, further comprising receiving from a user approval of a change made to the portfolio of data.

6. The method of claim 3, further comprising notifing users when a change is made to the portfolio.

7. The method of claim 3, further comprising associating sources of the data and source documentation to the data in the portfolio of data.

8. The method of claim 1, further comprising receiving from a user a definition of one or more plans to test the second set of data in the portfolio of data.

9. The method of claim 1, further comprising generating one or more reports from the portfolio of data.

10. The method of claim 1, further comprising comparing data by selecting the data from the portfolio and displaying the data in a side-by-side format.

11. A computer system for managing requirements, solutions, and deployments of a project comprising:
    a processor;
    a memory comprising:
        a repository of datasets comprising:
            a first dataset containing a plurality of data regarding the requirements of the project, wherein requirements comprise functions and events;
            a second dataset containing a plurality of data regarding the solutions for the project, wherein solutions have installation requirements; and
            a third dataset containing a plurality of data regarding the deployments for the project, wherein deployments comprise deployment sites and milestones;
            a first set of correlation maps linking one or more data in the first dataset to one or more data in the second dataset based on whether the solutions satisfy the requirements of the project;
            a second set of correlation maps linking one or more data in the first dataset to one or more data in the third dataset based on whether the requirements of the project are to be satisfied by the deployments and milestones; and
            a third set of correlation maps linking one or more data in the second dataset to one or more data in the third dataset based on whether the infrastructure resources satisfy the solutions;
    wherein the program instructions are executable by the processor to implement:
        displaying the repository and the mapping of the data in the repository; and
        querying the repository to determine the relationships and dependencies of the data in the repository and displaying query results; and
        displaying data based on whether the solutions satisfy requirements, wherein solutions that satisfy requirements are differentiated in the display by a visual indicator from solutions that do not satisfy requirements, whether requirements are satisfied at the deployment sites and milestones, wherein requirements that are satisfied by the deployment sites and milestones are differentiated in the display by a visual indicator from the requirements that are not satisfied by the deployment sites and milestones, or whether the infrastructure resources of the deployments satisfy the installation requirements of the solutions, wherein infrastructure resources of the deployments that satisfy the installation requirements of the solutions are differentiated in the display by a visual indicator from infrastructure resources of the deployments that do not satisfy the installation requirements of the solutions.

12. The computer system of claim 11, wherein the repository of datasets and the three sets of correlation maps are stored in a relational database.

13. The computer system of claim 11, wherein the repository of datasets is stored on a server computer and wherein the data are displayed on one or more client computers.

14. The computer system of claim 13, wherein querying the data is initiated on one or more client computers.

15. The computer system of claim 11, wherein the program instructions are executable by the processor to implement receiving from a user input edits to the data in the repository.

16. The computer system of claim 11, wherein the program instructions are executable by the processor to implement generating reports regarding the data in the repository.

17. The computer system of claim 11, wherein the query results are highlighted in different colors to indicate different levels of relationship between the data in the repository.

18. The method of claim 1, wherein the visual indicator differentiating solutions that satisfy requirements from solutions that do not satisfy requirements comprises highlighting of the solutions that satisfy the requirements, the visual indicator differentiating requirements that are satisfied by the deployment sites and milestones from the requirements that are not satisfied by the deployment sites and milestones comprises highlighting of the requirements that are satisfied by the deployment sites and milestones, or the visual indicator differentiating infrastructure resources of the deployments that satisfy the installation requirements of the solutions from infrastructure resources of the deployments that do not satisfy the installation requirements of the solutions comprises highlighting of the infrastructure resources of the deployments that satisfy the installation requirements of the solutions.

19. The method of claim 1, further comprising linking, by a correlation reasoner, the first set of correlation maps, the second set of correlation maps, and the third set of correlation maps, and providing information from the correlation reasoner to one or more users.

20. The computer system of claim 11, further comprising a correlation reasoner linking the first set of correlation maps, the second set of correlation maps, and the third set of correlation maps, wherein the correlation reasoner is configured to provide correlation information to one or more users of the computer system.

* * * * *